Oct. 19, 1965     F. A. CHIDSEY, JR., ETAL     3,212,227
CASE LOADER AND METHOD OF LOADING CASES
Filed March 2, 1962     6 Sheets-Sheet 1

INVENTORS
Francis A. Chidsey, Jr.
Grover C. Currie, Jr.
BY Richard W. Carpenter
ATTORNEY Oct. 19, 1965   F. A. CHIDSEY, JR., ETAL   3,212,227
CASE LOADER AND METHOD OF LOADING CASES
Filed March 2, 1962   6 Sheets-Sheet 3

FIG. 3

INVENTORS
Francis A. Chidsey, Jr.
Grover C. Currie, Jr.
BY Richard W. Carpenter
ATTORNEY

Oct. 19, 1965    F. A. CHIDSEY, JR., ETAL    3,212,227
CASE LOADER AND METHOD OF LOADING CASES
Filed March 2, 1962    6 Sheets-Sheet 5

INVENTORS
Francis A. Chidsey, Jr.
Grover C. Currie, Jr.
By Richard W. Carpenter ATTORNEY

United States Patent Office 3,212,227
Patented Oct. 19, 1965

3,212,227
CASE LOADER AND METHOD OF LOADING CASES
Francis A. Chidsey, Jr., Wayne, Pa., and Grover C. Currie, Jr., Charlotte, N.C., assignors to Container Corporation of America, Chicago, Ill., a corporation of Delaware
Filed Mar. 2, 1962, Ser. No. 177,032
10 Claims. (Cl. 53—35)

The present invention relates to case loading mechanism and to methods of loading cases, and more particularly to mechanism and methods for loading groups of articles such as bottles in packages into a shipping case or tray.

Among the important objects of the invention are to provide a fully automatic machine which is constructed to handle a group of bottle packages of the type in which the bottle necks or top portions project through openings in one wall of the package, the packages being constructed to be delivered to the machine in connected units each comprising two sub-groups which are separated into conventional sized packages containing, for example, six bottles each, arranged in two rows of three each.

Another object of the invention is to provide grasping mechanism for the bottles contained in the packages which will hold adjacent packages in angularly disposed relation, whereby the lower part of a group of packages presents a horizontal area slightly less than the area of the open top of the case to be loaded, thereby facilitating the loading of the package group into the case.

Additional objects of the invention are to provide simple mechanism for spacing groups of packages for the convenient insertion of divider panels, and to provide an effective mechanism for depositing divider panels into the spaces between the groups prior to the loading of the packages into a case.

Further objects of the invention are to provide highly efficient methods and mechanism for arranging a group of packages, grasping and moving such packages into case loading position, lifting the case to encompass the package group, releasing the group for movement into the case, then lowering the filled case and removing it from the machine, and continuing the cycle of raising, loading, then lowering and removing successive cases filled with package groups.

Additional and more specific objects and advantages of the present invention will appear as the description proceeds.

The mechanism herein disclosed is particularly adapted for use with bottle packages formed by wrapping a group of two rows of bottles within a rectangular paperboard strip. The top panel of the strip preferably has openings through which the necks of the bottles project. The ends of the package are open. Initially, twelve bottles, arranged in two rows of six bottles each, are enclosed within a wrapper blank that is designed to be divided centrally to form two units containing six bottles each, arranged in two rows of three bottles. To facilitate division of the initial twelve-bottle package into two six-bottle packages the blank may have a weakened line along which cutting takes place after the package has been completely glued. The glue joint is formed by overlapping flaps constituting the bottom panel, and the freshly formed packages are held on a conveyer of suitable length and moving at a speed slow enough to allow the glue to set before the packages are discharged.

After the glue joints have had sufficient time to set, the packages are partially separated by cutting the top and vertical walls and, in this condition, the packages are delivered to the mechanism disclosed herein. The six package units, still joined at their bottom panels, are advanced in abutted relation on a continuously moving belt conveyor or having a surface of conventional form which may readily slip beneath the packages without creating undue abrasion. The belt conveyor delivers the units in groups of four six-packs to a receiving station formed by anti-friction rolls arranged in two sections each of which is slightly inclined outwardly and downwardly, causing the joined six-pack units to be tilted away from each other. As the units pass onto this section they are severed by a cutting disk arranged centrally between the ends of the rolls. Stop elements are arranged at the discharge end of the roll section and, after a group of four six-packs comes to rest against the stops, a paperboard divider panel is dropped into place to separate the open ends of the adjacent units. In practice the bottles contained within each unit are held out of contact by a separate divider.

A case conveyor is provided to carry cases at right angles to the direction of movement of the bottle packages. This case conveyor has a step-by-step operation and the empty cases in turn are brought to rest on an elevator member upon which the empty case is raised to encompass package groups transferred off the receiving station rolls.

A reciprocable carriage is mounted on guides upon which it may move from a position over the receiving station rolls to a position over the elevator. The carriage is provided with gripping members which engage the bottle necks so that the bottle packages may be carried off the rolls to a position in registry with an empty case on the elevator. Just before the carriage begins to move from its position over the receiving station, the stops are removed and again brought into holding position after the trailing end of the group has cleared the stops. The continuously operating belt conveyor then advances all of the abutted packages until the leading packages engage the replaced stops.

When the carriage comes to rest over the empty case the elevator will lift the case into encompassing relation to the package group and, as the case reaches its upper limit of travel, the grippers are released, allowing the packages to be deposited within the case. The elevator then lowers the case and the carriage returns for the next package group. As soon as the filled case returns to the lever of the case travel it is moved onto a discharge section and at the same time an empty case is moved onto the elevator.

Referring particularly to the drawings, the partially severed pairs of six bottle packages A, A are advanced to the loading mechanism on the infeed or delivery conveyor indicated as a whole at 1. The package groups, comprising four six packs are delivered to the receiving station, comprising an anti-friction roller conveyor, indicated as a whole at 2. See FIG. 3. The reciprocable carriage 3 supports the bottle neck grippers indicated as a whole at 4. Removable stops, indicated at 5, serve to hold the package group on the roller conveyor until the grippers engage the bottles and the carriage is ready to move away from the roller conveyor. The cases B, B for receiving the package groups are advanced to the loader mechanism along a belt conveyor 6 and onto a roller conveyor section 7 by a sprocket chain conveyor 8. Empty cases are brought to rest on an elevator member 9 on which the case is lifted to receive the package group. Filled cases are discharged over a short roller conveyor section 7a onto a roller section 10 which may be supported independently of the loader mechanism.

Paperboard divider panels C are delivered into place between the six packs from a magazine 12 by a vacuum cup delivery mechanism, indicated as a whole at 13.

The bottle packages, illustrated herein, are in the form of six packs comprising two rows of three bottles each, held in a wrapper extending the full length of the rows. The wrapper employed in the present embodiment of the invention is initially of a width equal to the diameter of six bottles and is of rectangular shape to form in the first instance an open end package containing two rows of six bottles each. At a suitable point, not shown herein, the tops and vertical walls of the wrappers are severed, leaving the bottom wall intact until the packages are ready to move to the receiving station where they are engaged by the grippers. As shown, the top walls have openings through which the necks of the bottles project sufficiently to enable the grippers to engage them.

The principal operating parts are more or less completely enclosed within frame plates including a base frame member 16, side members 17, 17 and end members 18, 18 and 18a, 18b. Conveyor sections supported on the frame are designed to be joined to or aligned with cooperating conveyors arranged in operative relation to other existing machines for performing other necessary functions in a bottling and packaging plant.

DELIVERY CONVEYOR

Figure 3:
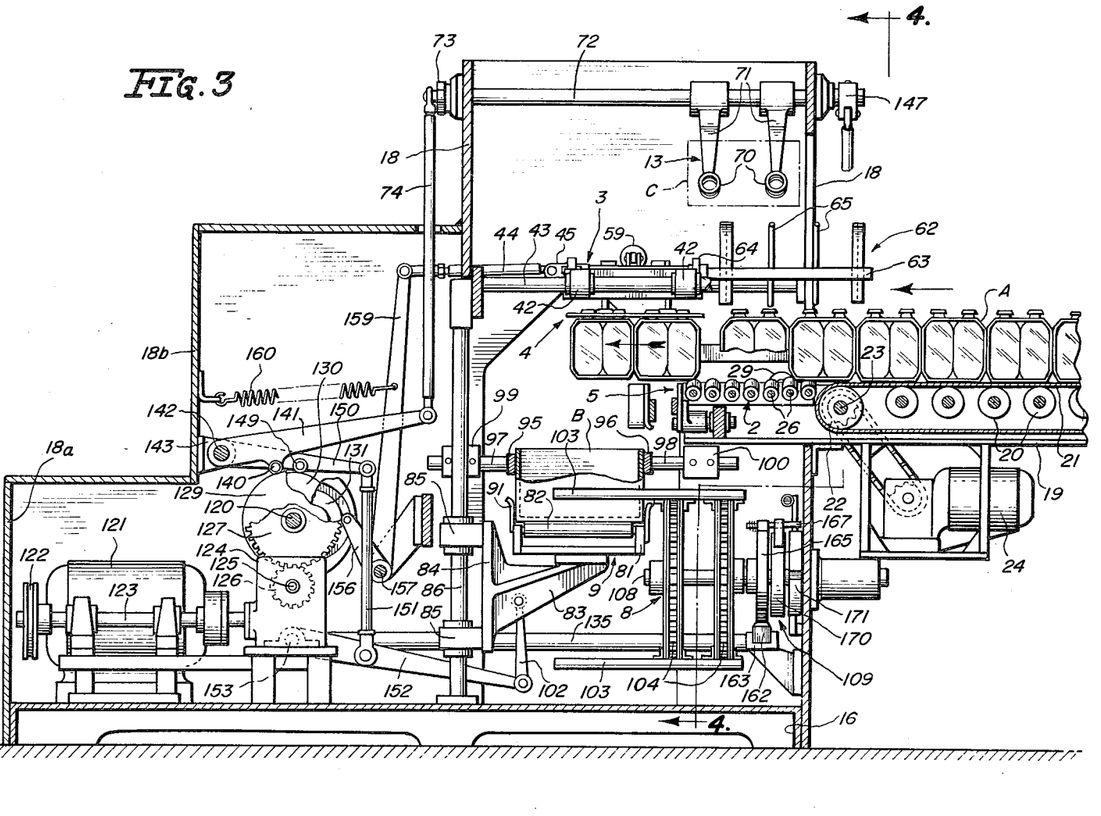
FIG. 3 is a vertical sectional view, taken along line 3—3 of FIG. 2, showing a line of abutted packages, with a group of packages held by the grippers on the gripper carriage as the carriage is being moved into position over an empty case on the case elevator.

The conveyor 1 which brings the packages into the loader mechanism will be referred to as the delivery conveyor. This conveyor is mounted on a supplemental frame member 19 which includes vertical side plates in which the spindles of a series of rollers 20, 20 are mounted. These rollers support belt conveyor means which may consist of a pair of endless belts 21 passing over rollers 22, 22 mounted on a shaft 23, journalled in the side plates of frame member 19. The shaft 23 is driven through a sprocket and chain mechanism, as shown in FIG. 3, suitably connected to a motor 24 supported on sub-frame pieces carried on frame member 19. Side guide bars 25, 25 are arranged at the sides of conveyor 1 to keep the flow of packages in satisfactory alignment. While the loading mechanism is in operation the belts 21 are continuously driven and as package groups are intermittently transferred into cases the flow of packages will start and stop while the belts continue to move beneath the packages.

RECEIVING CONVEYOR

The roller conveyor 2 comprises a support for a group of four six packs and is referred to as the receiving conveyor or receiving station. The removable package stops, indicated at 5, serve to retain a solid line of abutted packages extending onto the continuously operating conveyor belts 21. In practice, with two pairs of six packs on the roller conveyor 2, it is important to have a sufficiently large number of packages remaining on the moving belts so that the pressure of the line of packages advanced by the belts is sufficient to cause the leading two pairs of six packs to move promptly along the rollers and come to rest against the stops. A control switch S may be arranged at a suitable point along the belt conveyor to cause temporary discontinuance of the loader operation in the absence of a desired minimum number of packages on the belts 21. This may be effected by providing a clutch in the main drive for the machine which is automatically disconnected by actuation of the switch S if the supply of packages on conveyor 1 is discontinued so that no package is present at the switch location. The details of this control form no part of the invention.

Figure 4:
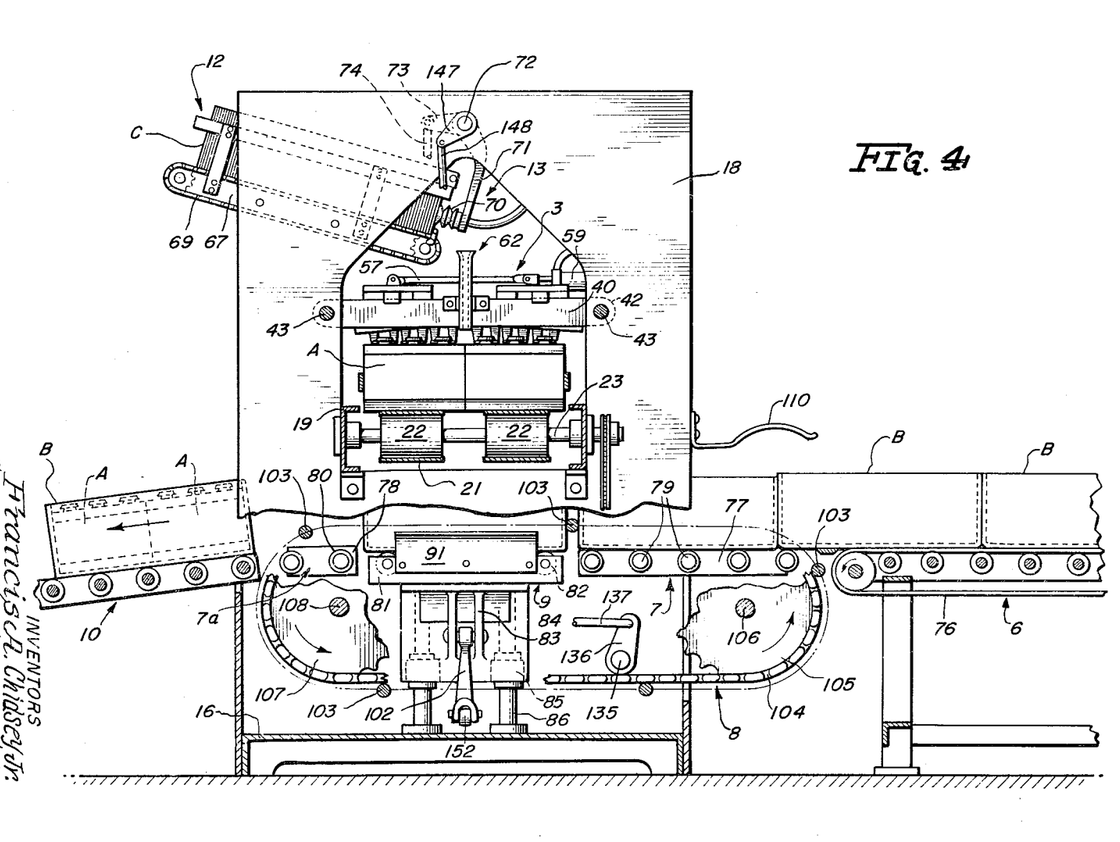
FIG. 4 is a vertical sectional view, taken along line 4—4 of FIG. 3, looking in the direction of the arrows, showing the arrangement of the magazine for the divider inserts and the guide means on the gripper carriage for directing the inserts into position between the two separable package sections, and also showing the conveyor with pusher rods for positioning cases on the case elevator.
Figures 10, 11:
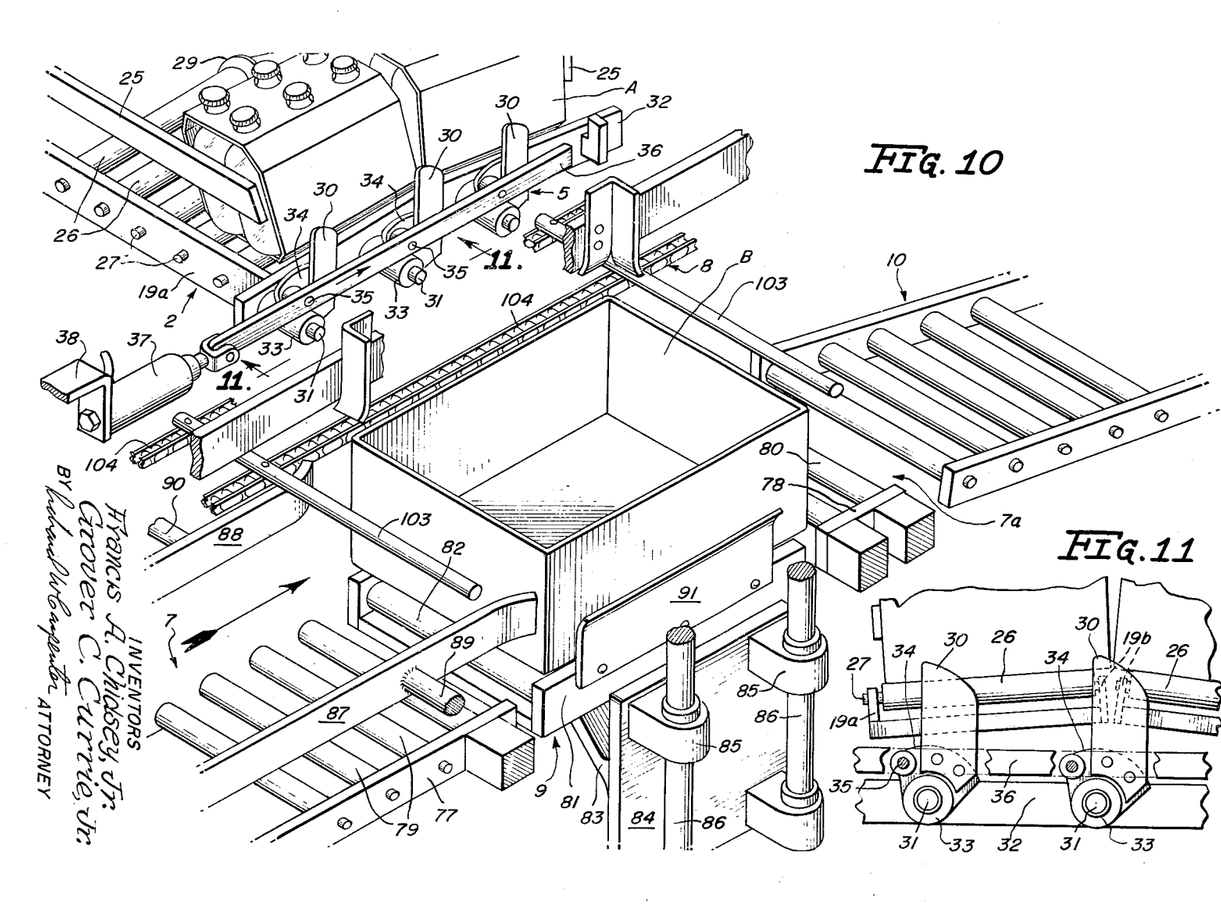
FIG. 10 is a partial perspective view, showing a portion of the case conveyor and elevator section, and showing the conveyor for bringing packages into position to be engaged by the grippers on the carriage.
FIG. 11 is a fragmentary detail view, showing two of the movable stop elements for holding packages on the package conveyor.

As shown in FIGS. 3, 4 and 10, the roller conveyor is arranged in two transversely positioned sections each of which is inclined outwardly and downwardly, preferably at about 2° inclination from the horizontal. The outer ends of the rolls 26, 26 of each section are mounted on spindles 27 received in openings in bars 19a carried on frame members 19, and the spindles on the inner ends of the rolls are supported in center frame pieces 19b, 19b, see FIGS. 3 and 11. As soon as a pair of joined six packs passes from the belts 21 to the roller conveyor sections, the common bottom panel, which is preferably formed with a weakened severance line between the package units, is slightly folded or deflected along the line of connection as the outer ends of the packages move down. As the packages advance, the weakened line of connection between the six pack units will pass over a cutting disk 29, supported between the frame elements 19b, and the two units will be released from each other. The units thus are separated slightly due to the opposite inclination of the rolls, and their outer surfaces will bear against the guides 25, 25 as the packages advance on the roller sections. Thus, as the two pairs of six packs come to rest on the roller sections when the leading pair contacts the stops, the adjacent packages across the median line between the roller sections will be tipped away from each other as well as being slightly spaced, leaving an angle of approximately 4° between adjacent packages as indicated in FIG. 10. As will be described presently, the angle between the transversely related pairs of packages facilitates the positioning of a divider panel centrally between the laterally related pairs of packages.

PACKAGE STOPS

Any suitable removable stop means may be employed to hold the advancing abutted rows of packages at the discharge end of the sectional roller conveyor 2. In the present instance three stop fingers, indicated at 30 are each mounted to swing in a vertical plane into and out of holding position. Pins 31 are secured in a bar 32, forming part of the supporting frame for the rollers 26. On each pin is mounted a rockable hub 33 to which a segmental plate 34 is rigidly secured. The stop fingers 30 are preferably secured to the segmental plates by machine screws. Connecting pins 35, projecting from the plates 34, have their ends received in openings in a reciprocable bar 36 having one end linked to the piston rod of a hydraulic piston and cylinder operating mechanism 37 secured in fixed position on a bracket 38 fixed on a main side frame plate. The end of link 36 may be formed with a vertical slot or other suitable connection with the piston rod to provide the necessary flexibility of connection to compensate for the vertical component of movement as the rod is reciprocated. Fluid under pressure is admitted to the cylinder to control the positions of the stops. This is controlled through a suitable solenoid valve actuated in timed relation to other operating parts by mechanism to be described late rherein.

BOTTLE NECK GRIPPER MECHANISM AND SUPPORTING CARRIAGE

After a group of four packages has been received at the receiving station and held by the stops 30 a bottle neck gripping means mounted on a reciprocable carriage moves into position to engage the bottles firmly and, after the stops are released, the packages will be moved off the rollers and held suspended beneath the carriage 3 in exact position over the case elevator member 9. The carriage 3 comprises a rectangular frame formed by front and rear bars 40, 40 and shorter side bars 41, 41. See FIGS. 6, 7 and 8.

The side bars 41 have secured thereto a pair of spaced apertured bosses 42, 42, each pair being slidably mounted on individual rods 43, 43 extending parallel to the direction of movement of the packages on the rolls 26, and having their ends secured in fixed position on opposite frame plates 18, 18, see FIG. 3. A link member 44, pivotally connected to the carriage at 45, is connected to suitable operating mechanism, to be described later, to move the carriage in and out.

Figure 6:
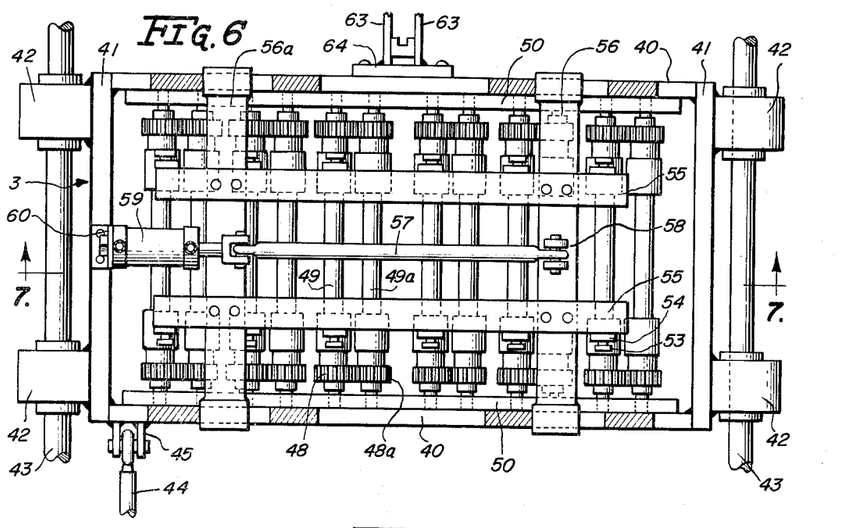
FIG. 6 is a fragmentary plan view on an enlarged scale showing details of the gripper mechanism.
Figure 7:
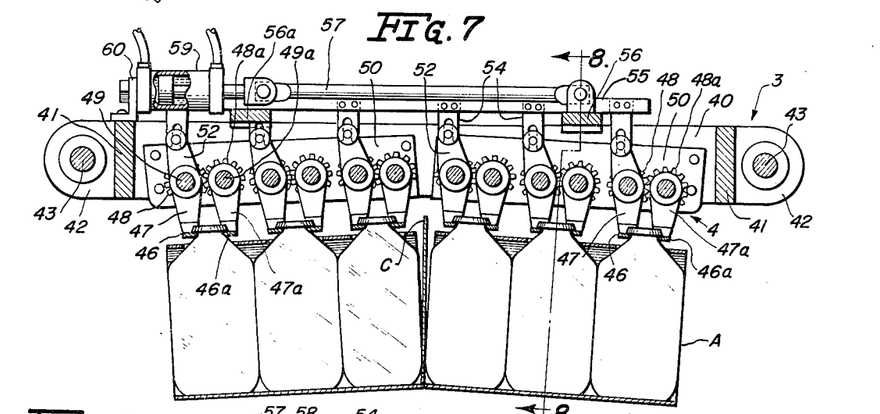
FIG. 7 is a vertical sectional view taken on line 7—7 of FIG. 6 showing the grippers in closed position around the projecting necks of groups of bottles contained in packages.
Figure 8:
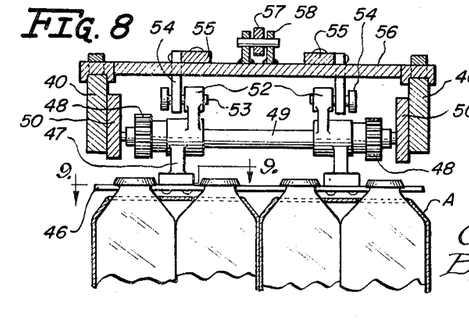
FIG. 8 is a sectional view taken on line 8—8 of FIG. 7 showing details of the gripper actuating devices.
Figure 9:
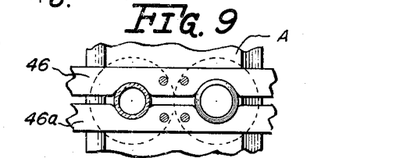
FIG. 9 is a fragmentary sectional view taken on line 9—9 of FIG. 8 showing the gripper jaws as they appear when viewed from above.

As best shown in FIGS. 7, 8 and 9, the bottle neck grippers comprise a plurality of pairs of parallel bars 46 and 46a, having rounded notches formed therein which fit closely around the bottle necks. See FIG. 9. These bars may engage beneath the usual bottle caps placed on the bottles or may engage beneath projecting ribs or beads on the bottle necks. The bars 46 and 46a are held respectively on the lower ends of pairs of arms 47 and 47a secured to meshing pinions 48 and 48a, which are mounted on parallel shafts 49, 49a having their ends journalled in bearings in frame members 50, 50 secured on the inner faces of the frame bars 40, 40. The arms 47 have extensions 52, see FIGS. 7 and 8, extending above the shafts 49 and 49a and in each extension is secured a pin 53 engaged by slotted yoke elements 54, 54 held on bars 55, 55. These bars form part of a slidable frame having cross bars 56, 56a the ends of which are shaped to embrace and slide upon the front and rear bars 40, 40 of the carriage. The outer end of an operating link 57 is secured at 58 to the cross bar 56. The other end of the link 57 is connected to the piston rod of a piston and cylinder member 59 secured on a bracket 60 on the carriage frame member 41. Fluid under pressure is admitted to the cylinder to control the movement of the gripper bars. This is controlled through a suitable solenoid valve actuated in timed relation to other operating parts by mechanism to be described later. As illustrated in FIGS. 6 and 7, it is apparent that movement of the piston rod to the left will cause the gripping jaws to move toward each other and the reverse movement will cause the jaws to open.

As best seen in FIG. 7, the gripping members are arranged in two groups of three pairs each. The group on the left in FIG. 7 is inclined downwardly to the left, and the right hand group is inclined downwardly to the right. The inclination of the groups of gripping bars conforms to the inclination of the two roller sections of the receiving conveyor 2. Thus, when the gripping bars are in open position, they are adapted to move along the projecting necks of bottles in the packages on the receiving conveyor and, when brought to a stop, the gripping bars may be operated simultaneously to grip each bottle in the package group. After the bottles have been engaged by the grippers the carriage may be moved to the left, as viewed in FIG. 3, where the packages will be held suspended over an open case on the elevator 9.

DIVIDER INSERTING MECHANISM

The mechanism for inserting dividers between the packages comprises a guide frame on the gripper carriage and a vacuum cup feeding means which removes a single divider panel from a magazine and drops the panel through the guides and in place between the packages while they are positioned on the receiving conveyor rolls. As shown in FIGS. 1, 3, 4 and 6, the divider guide, indicated generally at 62, is formed by a pair of bars 63, 63 having their ends welded to a cross piece 64 (see FIG. 6), bolted centrally on the frame member 40 of the carriage. On the adjacent faces of the bars 63, 63 are secured vertical rods 65, 65 flared outwardly at their upper ends. As the lower ends of the vertical rods are open, the guide serves merely to direct the divider panels into position between the spaced and outwardly tilted packages.

The divider panel magazine is generally of conventional form and comprises side frame elements 67 and 68, secured on the front frame plate 18, and a suitable endless conveyor 69, which may consist of two or more sprocket chains, passing over sprockets on shafts journalled on the frame elements 68. A pair of vacuum cups 70, 70, supported at the ends of pivoted arms 71, 71 serve to withdraw the paperboard divider panels singly from the magazine for deposit through the guide member 62. The arms 71 are secured on a rocket shaft 72, held in bearings in the frame plates 18, 18. One end of the shaft 72 extends through the rear frame plate 18 and carries a crank lever 73 connected by a vertically extending link 74 to operating mechanism to be later described. Each time the carriage is moved to the left, as viewed in FIG. 3, in order to position a package group over an empty case, the rock shaft 72 will be moved to swing the vacuum cups over the guides and deposit a divider panel therethrough into position between the packages on the roller conveyor. Suitable conventional control means operates to connect the vacuum cups to a source of negative pressure in proper timed relation to the movement of arms 71 so that the cups will first engage a divider panel and remove it from the magazine and then release the panel when the cups are properly positioned over the guide frame. Vacuum control means for the oscillating vacuum cups may be essentially as shown in copending application, Serial No. 791,298, filed Feb. 5, 1959, now Patent No. 3,013,796 and assigned to the assignee of this application.

CASE CONVEYOR AND ELEVATOR

The empty cases B, B may be delivered to the loader device on any suitable conveyor means such as a continuously operating belt conveyor 76. See FIG. 4. This belt conveyor will be placed so as to deliver an empty case to the case conveyor section 7 each time cases are advanced by the chain conveyor 8. The conveyor sections 7 and 7a are in the form of roller conveyors having side frame portions 77 and 78. The frame potions 77 and 78 are secured to the rear frame plate 18. Anti-friction rollers 79, 79 and 80, 80 ae journalled in the respective frame portions of sections 7 and 7a. The elevator conveyor section has side frame portions 81, 81 which support rolls 82, 82. The frame portions 81 are supported on bracket arms 83, 83 projecting from a back plate 84, provided with outstanding apertured bosses 85, 85 having bearings slidable on vertical rods 86, 86.

Side guide bars 87 and 88, see FIG. 10, are arranged above conveyor section 7. These are secured on the ends of rods 89 and 90 as by means of welding and the other ends of such rods are secured to suitable transverse frame members. Guide plates 91, 91 are secured to the side portions 81 of the elevator section to assist in proper positioning of the empty case. On opposite sides of the elevator there ae secured vertically positioned angle iron guide members 92, 92, having flaring lower ends. These are fixed on a supplemental frame piece 93. These guide members are arranged to engage opposite corners of the empty case as it is lifted by the elevator section to keep the case in proper registration with the package group held on the carriage 4.

Additionally guide bars 95 and 96 are provided, see FIG. 3. These are held on adjustable rods 97 and 98 which pass respectively through blocks 99 and 100 in which they may be held in proper adjusted positions by set screws. The blocks 99 and 100 are suitably secured to the base frame.

A link 102, see FIGS. 3 and 4 is pivotally secured between the elevator bracket arms 83 and connects the arms to operating mechanism, to be later described, for raising and lowering the elevator.

In order to advance the empty cases and to discharge the full cases the chain conveyor 8 is employed having pusher bars 103, 103 arranged to pass up around the receiving end of roller conveyor section 7, over the elevator section 9, then over and downward around the discharge end of roller conveyor section 7a. The pusher bars 103, 103 are preferably supported at one end by securing them at spaced points to a pair of spaced sprocket chains 104, 104 passing over sprockets 105, 105 on an idle shaft 106 and over sprockets 107, 107 on an intermittently driven shaft 108. The shafts 106 and 108 are suitably journalled in bearings supported on the forward frame plate 18 and shaft 108 is provided with driving mechanism, indicated at 109 and which will be later described, to move the pusher bars forward a predetermined distance at each step. It is to be noted that the conveyo sections 7 and 7a, as previously pointed out, are supported from one side only so that the pusher rods 103 may pass freely around them.

The driven shaft 108 for actuating conveyor 8 is intermittently rotated in timed relation to the movement of elevator 9. As the elevator moves down with a full case and comes to rest with its rollers 82 aligned with rollers 79 and 80 of the conveyor sections 7 and 7a at each side of the elevator, the conveyor 8 will then advance to discharge the loaded case over conveyor section 7a and onto conveyor section 10. At the same time an empty case will be delivered onto the elevator, and the pusher rod for this case will come to a stop as shown in FIG. 4 in a position where it will be clear of the elevator as it rises with the empty case. As the conveyor belt 76 is continuously driven and normally contains a plurality of cases abutted end to end, the row of cases on this conveyor will advance and the leading case will be moved onto the roller conveyor section 7 and will come to rest against the pusher rod 103 at the rear of the case delivered onto the elevator. By reference to FIG. 4 it will be seen that the next pusher rod 103 following the one adjacent the elevator is disposed below the line of abutted cases and somewhat to the rear of the leading case ready to be moved onto the elevator. On the next advance of the conveyor the pusher rod 103 rises against the bottom of the second empty case and lifts it a short distance. It then slips forward and engages the trailing wall of the leading case. A spring guard 110 is provided to limit the upward displacement of the cases by the pusher rod.

The mechanism for driving shaft 108 comprises a generally conventional, intermittent driving mechanism indicated generally at 109 and will be briefly described below.

A cam shaft 111, see FIG. 2, has cams 112, 113 and 114 adjustably secured thereon to actuate switches 115, 116 and 117 for controlling solenoid valves which, in turn, control the flow of fluid under pressure to the piston and cylinder mechanisms for the package stops and for closing and subsequently opening the gripper elements.

DRIVING MECHANISM

Figure 2:
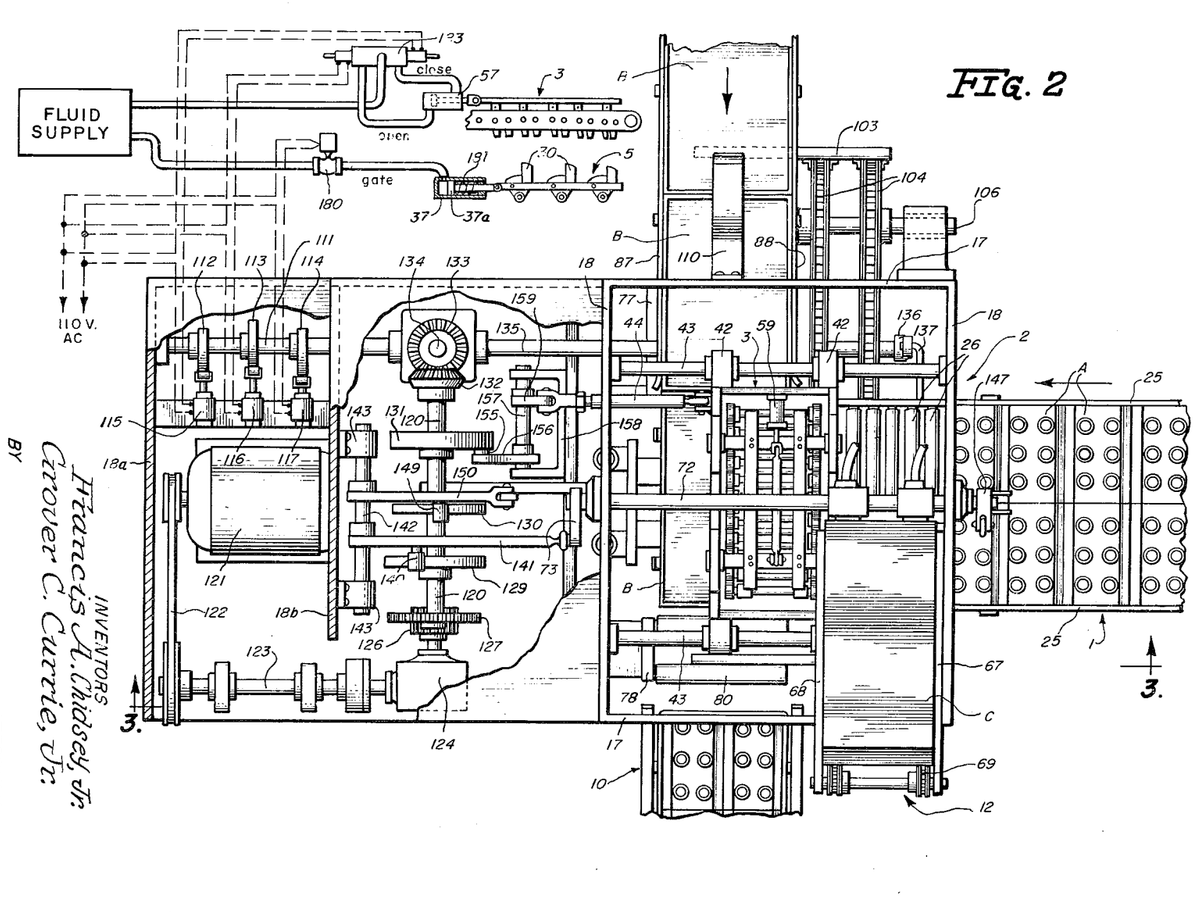
FIG. 2 is a horizontal sectional view, with certain parts omitted, taken along line 2—2 of FIG. 1, showing the carriage on which the grippers are mounted, the actuating device for the grippers, the magazine for the divider inserts, the actuating means for moving the carriage for the case elevator, and for the vacuum cup arms, and also showing the wiring diagram and solenoid valves for controlling flow of fluid to the actuating members for the grippers and package stops.

A main drive shaft 120, see FIGS. 2 and 3, is suitably journalled on the base frame members and is driven by a motor 121 through intermediate gearing comprising a belt 122 passing over pulleys on the motor shaft and a short shaft 123. This shaft drives suitable reduction gearing in gear box 124 which in turn drives a stub shaft 125 carrying pinion 126 meshing with a gear 127 fixed on the drive shaft 120.

The shaft 120 has adjustably fixed thereon three cam members 129, 130 and 131 which actuate respectively the vacuum cup arms, the case elevator and the gripper carriage. At its end opposite gear 127 the shaft 120 carries a bevel gear 132 meshing with a bevel gear 133 on a vertical shaft 134. This shaft carries a bevel gear at its lower end meshing with similar gears on shaft 111, carrying the switch operating cams, and on shaft 135 extending toward the right as viewed in FIGS. 2 and 3. Shaft 135 carries at its end a crank arm 136 operating a connecting rod 137 see FIGS. 2 and 4, to actuate the step-by-step drive for the case conveyor.

*Drive for vacuum cup arms*

The cam 129 for the vacuum cup arms has an exterior cam surface upon which a cam roller 140 bears. The cam roller 140 is carried on a rocker arm 141 pivoted on a shaft or rod 142 held in brackets 143, 143 fixed on frame plate 18b. See FIGS. 2 and 3. The outer end of arm 141 is pivotally joined to a link 74 connected to a rocker arm 73 fixed on rock shaft 72 on to the other end of which are fixed the two rocker arms 71, 71 carrying the vacuum cups 70, 70. With each evolution of the cam 129 one divider is removed from the magazine and dropped through the divider guide and in between the tilted packages. The shaft 72 preferably carries at its end a second rocker arm 147 to which a rod 69 is connected for the purpose of operating a ratchet drive for the chain support 148, serving to carry the dividers C foward in the magazine 12 as the dividers are removed at the discharge end. The particular construction of the magazine feed forms no part of the present invention.

*Drive for case elevator*

The cam 130, like cam 129, has an exterior cam surface upon which a cam roller 149 bears. This roller is carried on an arm 150 pivotally mounted at one end on the rod 142. At its outer end the arm 150 is pivotally connected to the upper end of a vertically disposed link 151. The lower end of this link is pivoted intermediate the ends of a rocker arm 152, one end of which is pivoted at 153 on the base frame. The outer end of link 153 is pivotally connected to the lower end of vertical link 102 which, as previously described, has its upper end pivotally connected to the elevator between the arms 83. The elevator moves up and down once for each revolution of the cam 130.

*Drive for gripper carriage*

The cam 131 has a cam groove in one face into which a cam roller 155 is received. This roller is carried at the upper end of a rocker arm 156 keyed to a rock shaft 157 journalled in a bracket element 158 secured to the base frame. A second, vertically disposed rocker arm, indicated at 159, has its lower end keyed to the rock shaft 157. At its upper end the rocker arm 159 is pivotally connected to link 44, previously referred to as pivotally connected to the gripper carriage 3. The link 44 is preferably adjustable in length to enable the carriage to be positioned with accuracy over the case to be loaded. Arm 159 is urged toward carriage retracting position by a coil spring 160. With each rotation of the cam 131 the gripper carriage is reciprocated in and out. The shape of the cam guide provides for a small dwell period when the carriage is moved into package engaging position and a longer dwell period when the carriage has been moved to unloading position over a case on the elevator.

*Drive for case conveyor*

The purpose of the step-by-step driving mechanism 109 is to cause each successive pusher rod 103 on the conveyor chains 104 to advance a distance somewhat in excess of a case length and thereby bring an empty case into proper position on the case elevator. See FIGS. 4 and 10. Simultaneously a loaded case is moved onto the discharge conveyor 10. In order to drive shaft 108 through the desired angular distance there is provided a reciprocal rack bar 162, slidable in a fixed guide 163. The rack bar is reciprocated by means of a link 137 operated by the crank arm 136 on the end of shaft 135. See FIGS. 2 and 5.

The teeth of rack 162 mesh with the gear teeth of an oscillating gear element 165 which is free to move on shaft 108. See FIG. 5a. The gear 165 has a projecting lug 166 having an opening in which a pin 167 is received with freedom for limited rocking movement. This pin carries a fixed detent or pawl element 168, held out of the plane of gear 165 and adapted successively to engage notched surfaces 169, 169 of a disk 170, keyed to the shaft 108. The detent 168 is spring loaded to hold its free end against the peripheral surface of disk 170.

A second disk 171 is keyed on the shaft 108 and is formed with a pair of notches 172, 172a into which a locking detent 173 on arm 174 is adapted to engage. The arm 174 is pivoted on frame plate 18 at its lower end and its upper end is secured to a coil spring 175 having one end secured to the plate 18. The pin 167 extends across the periphery of disk 171 to a position where it can strike against the upper end of arm 174 and swing it counterclockwise, as viewed in FIG. 5, to lift detent 173 out of its notch.

Figures 1, 5, 5A, 5B, 5C:
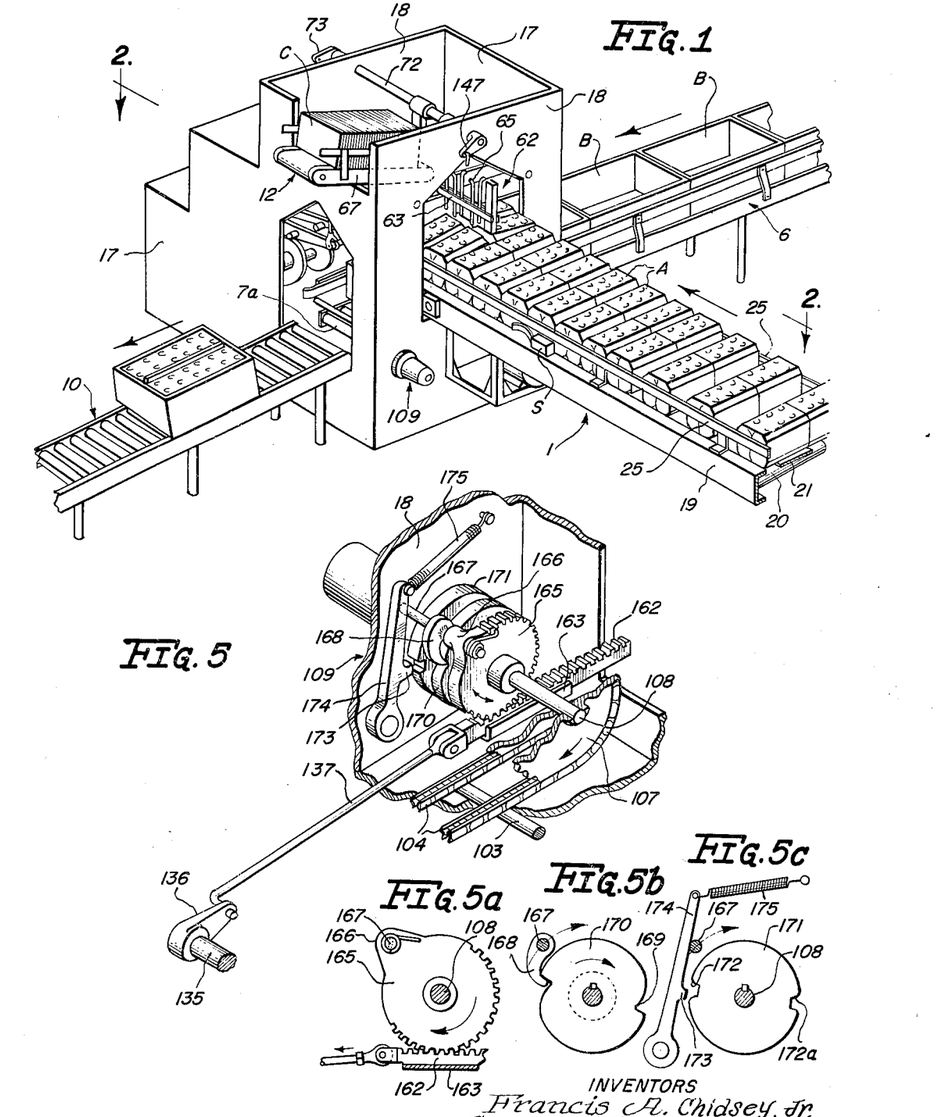
FIG. 1 is a somewhat schematic and simplified, perspective view showing the general arrangement of the package conveyor and the conveyors for conducting empty cases to the loading point and filled cases away from the loading point.
FIGS. 5, 5a, 5b and 5c are detail views of the step-by-step driving mechanism for the case conveyor.

While the pin 167 remains in contact with the arm 174 to hold the detent 173 out of notch 172, the detent 168 engages one of the notched surfaces 169 and is ready to rotate shaft 108 clockwise when the rack is moved toward the left, as seen in FIG. 5. As soon as the pin 167 clears the arm 174 the detent 173 is again free to bear upon the surface of the disk 171 and will drop into notch 172a after this disk has moved through 180°. This assures that shaft 108 will move one-half a revolution and at the end of this movement it will be held stationary.

Upon the return movement of rack 162, the detent 173 remains in its notch in disk 171, holding both disk 170 and disk 171 stationary, and detent 168 rides out of its notch 169 and bears upon the surface of disk 170 which remains at rest. The gear element 165 will turn counterclockwise upon movement of the rack to the right, as viewed in FIG. 5, and the detent will move counterclockwise around the edge of disk 170 until it drops into the waiting notch. Just before the detent 168 drops into its notch the pin 167 strikes the arm 174 and lifts detent 173 out of its notch 172 and holds it in disengaged position. As the movement of the rack is reversed, the disks 170 and 171 move together, propelled by the detent 168. The pin 167, as it moves with the disks, remains in engagement with arm 174 for a sufficient interval to allow the notch 172 to move clear of the detent 173. After the pin 167 moves out of contact with the arm, the detent rides on the surface of disk 171 until the opposite notch 172 reaches the detent, whereupon the detent snaps into the notch and the shaft 108 is held positively against movement in either direction. Thus the conveyor chain and pusher bars 103 will advance one step and will be firmly held in position while the case on the elevator rises to be loaded and then is returned to its lowered position.

CONTROLS FOR THE PACKAGE STOPS AND GRIPPERS

The controls for the package stops and grippers are actuated in timed relation to the cams on shaft 120 and the intermittent drive for the case conveyor. As previously stated the stops are actuated by a fluid controlled piston and cylinder mechanism 37. See FIG. 10. Flow of fluid under pressure to the cylinder is controlled by solenoid valve 180, and valve 180 is actuated by closing of switch 117 by cam 114 on shaft 111. See FIG. 2. The stops are normally held in closed position by spring 181 bearing against the piston 37a and the cam 114 is preferably formed with a dwell surface that will maintain the switch closed during the interval necessary for the package group to be removed from the rollers at the receiving station 2. Reopening of the switch 114 allows valve 180 to close and pressure will be relieved from the piston 37a. Spring 181 will then move the piston to the left as viewed in FIG. 2 and the stops will return to package holding position.

The grippers are opened and closed by piston and cylinder mechanism 59. See FIGS. 6 and 7. It is preferred to employ a double acting four way solenoid valve 183 to control the flow of pressure fluid to the cylinder. Actuation of switch 115 by cam 112 causes fluid to enter the cylinder on the right as seen in FIG. 2 to force the grippers to closed position and actuation of switch 116 by cam 113 causes fluid to exhaust from the right and enter into the left hand end of the cylinder to move the grippers to open position. The particular construction and arrangement of the cams and valves for opening and closing the gripper jaws is immaterial to the present invention. Any well known form of solenoid valve may be employed so as to close and open the jaws in proper timed relation to the movements of the gripper carriage.

OPERATION

Reviewing the operation—pairs of joined six packs are directed from a packaging machine over the delivery conveyor 1 to the receiving station 2. The packages are collected in abutted relation upon the constantly moving belts and come to rest against the stop mechanism 5 at the discharge end of the receiving station. A supply of empty cases, abutted end to end is arranged on the case conveyor 6 and an empty case may be placed on the elevator section. The case conveyor belt is also continuously operating to urge cases forward so that, when a case is being handled on the elevator section, an empty case will be in proper position on roller conveyor section 7 with its leading edge bearing against pusher 103 at the edge of the elevator.

In starting the machine, the gripper jaws are open and the carriage is in position over the receiving station so that the grippers are ready to grip the bottle necks of the packages. In sequence, the grippers engage the bottle necks of the packages and the stops are moved to lowered position where they are held for a brief period. The carriage is then moved to a position over the elevator. As soon as the package group supported by the carriage clears the delivery station the stops are moved back to holding position. Two pairs of six packs are then advanced onto the receiving station and, as they so move, the connected bottom panels are severed in passing over the disk cutter 29.

While the carriage is over the elevator and after the package group comes to rest against the stops, the vacuum cup arms are actuated to withdraw a divider from the magazine and drop it through the divider guide member and into position between the packages at the receiving station.

With the carriage in position over the elevator section this section is elevated by its cam 130 and other operating parts so that the empty case on the elevator encompasses the sides of the package group. With the elevator at the top of its travel it remains in such position briefly. At this time the gripper jaws are opened with a rapid movement and the packages are allowed to drop a very short distance onto the case bottom.

The gripper jaws remain open and the carriage is again moved over the receiving station with the gripper bars passing in between adjacent bottle necks. As the carriage moves to position over the receiving station the elevator descends into horizontal alignment with the conveyor sections. With the elevator in down position the conveyor 8 is driven forward one step. This moves the filled case onto the discharge conveyor 10. At the same time the pusher rod 103, following the filled case, rises up against the bottom of the first case following the leading empty case and lifts the front end of this case momentarily, after which the pusher rod moves in behind the leading case and derives it onto the elevator.

In practice, as indicated in FIG. 3, the gripper carriage moves the bottle group off the receiving station with a movement somewhat faster than the movement of packages onto the receiving station. Thus a small space is created between the oncoming packages and the trailing edge of the package group just removed. This allows the stops to move back their holding position without likelihood of striking a package.

As all of the cams are readily adjustable on their shafts, it is a relatively simple matter to adjust the timing of the parts to a high degree of precision.

While only a single saftety switch has been illustrated (namely, the switch S to interrupt the operation in event of too few packages on the delivery conveyor) it is to be understood that additional safety or limit switches may be employed wherever necessary to assure normal operation of the machine. Such switches and their safety functions are well known to those skilled in production of this general type of machinery.

From the foregoing it is apparent that the embodiment of the invention disclosed herein provides a very compact and effective loader for packages that may operate at relatively high speed and requires only a minimum of supervision. The mechanism by which spaces between the package units are created as the units move toward the assembly point may be employed with other types of packages with equal facility. By utilizing an arrangement of parts by which the package units are tilted outwardly to provide a space for insertion of a divider, and by employing grippers which retain the packages in this same relationship, the assembly of the divider panel between the units is readily effected, and at the same time the delivery of the package group into a case is facilitated. Since the two sets of oppositely inclined package units in the package group creates in effect a temporarily reduced dimension for the lower surface of the group, the delivery of the group into the case may be accomplished successfully without requiring an extreme degree of precision in aligning the case elevator and the gripper carriage. It will also be noted that in the particular form of packages illustrated, the tapered lower edges of the packages lengthwise of the rows of bottles facilitates entry of two opposite sides of the package group into its case.

The novel procedure or method by which the package units are delivered to the assembly point in a manner which spaces the packages and allows ready insertion of a divider panel, and the method of gripping and then moving the package group while retained in this same arrangement, and then inserting the group into a case may be performed by simple instrumentalities largely under manual control, if desired, and are effective irrespective of the particular instrumentalities that may be employed.

It is further to be understood that the present invention is not limited in all respects to the handling of packaged bottles. Certain aspects of the mechanical and the methods disclosed may apply to bottles not in packages. Also certain phases of the invention are applicable to the effective handling and loading of packages irrespective of their contents.

While the present description sets forth a preferred embodiment of the invention, numerous changes may be made in the mechanism as disclosed without departing from the spirit of the invention, and it is therefore desired that the present embodiment be considered in all respects as illustrative and not restrictive, reference being had to the appended claims rather than to the foregoing description to indicate the scope of the invention.

We claim:

1. A method of loading a rectangular, open top case with a group of rectangularly shaped packages, the group having normal dimensions in a horizontal plane slightly less than the internal, horizontal dimensions of the case, whereby the group of packages is dimensioned to fit snugly within the case, such method comprising assembling the packages of the group at a receiving station in two parallel rows, with the lower adjacent corner edges of the packages disposed immediately adjacent to one another and substantially meeting and with the packages of the rows being inclined slightly away from one another so that the opposite side wall surfaces of the packages converge downwardly at a small angle, positioning an open top case at a loading station with its top disposed upward, transferring the packages of the group of a gripping device from the receiving station to a position above and in registry with the case at the loading station while maintaining such inclined relationship between the packages of the rows, raising the case to encompass the lower portion of the packages, simultaneously releasing the packages from the gripping device to allow them to move into parallel relation as they come to rest within the case.

2. In a mechanism for loading within an open top case a group of bottle packages of the type comprising one or more rows of bottles held within a paperboard wrapper, such bottle packages being initially formed in separable package units joined along a common lower wall, the combination of a delivery conveyor arranged to carry pairs of connected package units in end to end relation disposed transversely of the direction of conveyor travel, a receiving conveyor arranged to receive such connected package units, said receiving conveyor comprising two laterally disposed sections sloping outwardly and downwardly from the median line of the conveyor, whereby two connected package units when moving thereon will be tipped outwardly away from each other, and a wall serving means located on the median line between the conveyor sections to cut the lower wall and separate the package units as the pair of connected units moves onto the receiving conveyor.

3. In a mechanism for loading within an open top case a group of bottle packages of the type comprising one or more rows of bottles held within a carton, the combination of a conveyor comprising two laterally disposed sections sloping outwardly and downwardly from the median line of the conveyor, whereby two adjacent packages disposed in transverse alignment on the conveyor will be disposed in positions inclined outwardly away from each other, a carriage mounted on guide members supporting the carriage for reciprocation at a level above the conveyor, means for moving the carriage from a position above the conveyor to a position clear of such conveyor, divider panel guide means supported by an extending the carriage above the median line between the conveyor sections, and means for delivering a divider panel along such guide means and into position between adjacent, outwardly tipped packages on the conveyor when the carriage has been moved to a position clear of the conveyor.

4. In a mechanism for loading within an open top case a group of bottle packages of the type comprising one or more rows of bottles held within a wrapper having an apertured top wall through which the bottle necks project, the combination of a delivery conveyor adapted to carry groups of bottle packages in adjacent rows in which pairs of bottle packages are arranged in end to end relation transversely of the conveyor, a receiving conveyor arranged to receive bottle packages from the delivery conveyor, said receiving conveyor comprising two laterally disposed sections sloping outwardly and downwardly from the median line of the conveyor, whereby two adjacent packages disposed in transverse alignment on the receiving conveyor will be inclined outwardly away from each other, a carriage mounted on guide members supporting the carriage for reciprocation at a level above the receiving conveyor, means for moving the carriage from a position above the receiving conveyor to a position clear of such conveyor, bottle neck gripping members on the carriage arranged to engage and support packaged bottles delivered to the receiving conveyor and to carry such packaged bottles with the carriage when it is moved clear of such conveyor, means for actuating the gripping members to engage the bottle necks, divider panel guide means supported by and extending from the carriage above the median line between the receiving conveyor sections, and means for delivering a divider panel along such guide means and into position between adjacent, outwardly inclined packages on the receiving conveyor when the carriage has been moved to a position clear of the receiving conveyor.

5. In a mechanism for loading within an open top case a group of generally rectangular packages, comprising, in combination, a receiving conveyor adapted to support the packages in adjacent rows transversely to the direction of travel, guide members extending in the direction of conveyor travel, a carriage supported for movement on the guide members, package gripping members on the carriage arranged to be moved with the carriage into gripping relation to the packages on the receiving conveyor and support the packages in dependent condition from the carriage, means for actuating the gripping members, means for moving the carriage to bring the packages clear of the receiving conveyor, means for positioning an open top case in registration below the packages when moved clear of the receiving conveyor, means for lifting the case into encompassing relation with the package group depending from the carriage, the gripping members being arranged to support adjacent packages in outwardly and downwardly tipped relation to facilitate the encompassing of the package group by the lifted case, and means for releasing the gripping members from the packages to transfer the package group to the case.

6. A mechanism, as defined in claim 5, in which the delivery conveyor comprises continuously operable means for urging an abutted line of packages toward the receiving conveyor, removable stop means for retaining packages on the receiving conveyor, actuating means for the stop means, and control means timed with the movement of the carriage to bring the stop means into package holding position after the trailing end of a package group, moved outwardly by the carriage, clears the receiving conveyor.

7. In a mechanism for loading within an open top case a group of generally rectangular packages, comprising, in combination, a delivery conveyor adapted to carry groups of packages in adjacent rows in which pairs of packages are arranged transversely of the direction of conveyor travel, a receiving conveyor arranged to receive packages from the delivery conveyor, said receiving conveyor comprising two laterally disposed sections inclined outwardly and downwardly from the median line of the conveyor, whereby the adjacent packages disposed in transverse alignment on the receiving conveyor will be inclined outwardly away from each other, guide members extending in the direction of conveyor travel, a carriage supported for movement on the guide members, package gripping members on the carriage arranged to be moved with the carriage into gripping relation to the packages on the receiving conveyor and support the packages in dependent condition from the carriage, means for actuating the gripping members, means for moving the carriage to bring the packages clear of the receiving conveyor, means for positioning an open top case in registration below the packages when moved clear of the receiving conveyor, means for lifting the case into encompassing relation with the package group depending from the carriage, the gripping members being arranged to support adjacent packages in the outwardly and downwardly inclined relation in which they are disposed on the receiving conveyor, thereby to facilitate the encompassing of the package group by the lifted case, and means for releasing the gripping members from the packages to transfer the package group to the case.

8. A mechanism, as defined in claim 7, including means for delivering a group of packages onto the receiving conveyor to replace the group removed by the gripping members on the movable carriage, and means timed with the movement of the carriage into its position clear of the receiving conveyor to deposit a divider panel edgewise between the adjacent, outwardly inclined packages on the receiving conveyor.

9. In a loading mechanism for delivering bottle packages into a shipping case, such bottle packages being initially formed in separable package units joined along a common lower wall, the combination of a conveying means arranged to carry connected package units in end to end relation, disposed transversely of the direction of conveyor travel, and a wall severing means located in the path of packages carried on the conveying means and serving to cut the common lower wall as the connected units pass the severing means.

10. In a mechanism for loading an open top case with a group of packages, the combination of conveying means for delivering groups of packages to a receiving station, a case elevator for raising an open top case, a case conveyor arranged to deliver a case onto the case elevator, a reciprocable carriage, means for moving the carriage between a position over the package receiving station to a position clear of such station and in registration over a case on the case elevator, means on the carriage for engaging and supporting a package group at the receiving station, means for raising the elevator, control means therefor timed to raise such elevator to bring a case into encompassing relation to a package group held by the carriage after the carriage has been moved to its position over the elevator, and control means for the package engaging and supporting means on the carriage to release the package group supported thereby in timed relation with the movement of the elevator as it reaches its upper limit of travel.

References Cited by the Examiner

UNITED STATES PATENTS

| | | | |
|---|---|---|---|
| 2,254,097 | 8/41 | Wood | 53—157 |
| 2,255,576 | 9/41 | Wesselman | 53—48 |
| 2,431,265 | 11/47 | Madsen | 53—166 |
| 2,608,330 | 8/52 | Arneson | 53—159 X |
| 2,615,289 | 10/52 | Hickin | 53—157 X |
| 2,712,405 | 7/55 | Rockcastle | 53—166 |
| 2,796,709 | 6/57 | Bolding | 53—159 X |
| 2,834,167 | 5/58 | Loveridge | 53—166 X |
| 2,898,716 | 8/59 | Cella et al. | 53—247 X |
| 2,957,287 | 10/60 | Cella | 53—166 X |
| 3,031,813 | 5/62 | Ganz | 53—48 X |
| 3,067,554 | 12/62 | De Back | 53—157 |

FRANK E. BAILEY, *Primary Examiner.*

BROMLEY SEELEY, *Examiner.*